(12) United States Patent
Chow et al.

(10) Patent No.: US 9,107,146 B2
(45) Date of Patent: *Aug. 11, 2015

(54) SMART CONNECTION MANAGER

(71) Applicant: T-Mobile USA, Inc., Bellevue, WA (US)

(72) Inventors: Paulo Chow, North Bend, WA (US);
Mark Drovdahl, Seattle, WA (US);
Sinclair M. Temple, Seattle, WA (US);
Parker Ralph Kuncl, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,316

(22) Filed: Aug. 15, 2013

(65) Prior Publication Data
US 2014/0050118 A1    Feb. 20, 2014

Related U.S. Application Data

(63) Continuation of application No. 13/011,772, filed on Jan. 21, 2011, now Pat. No. 8,514,717.

(51) Int. Cl.
*H04W 48/16* (2009.01)
*H04W 48/18* (2009.01)
*H04W 48/08* (2009.01)
*H04W 88/06* (2009.01)

(52) U.S. Cl.
CPC ............. *H04W 48/16* (2013.01); *H04W 48/18* (2013.01); *H04W 48/08* (2013.01); *H04W 88/06* (2013.01)

(58) Field of Classification Search
CPC ..... H04W 48/16; H04W 48/18; H04W 48/08; H04W 88/06
USPC .......... 370/254, 237, 346, 328, 331, 338, 449
See application file for complete search history.

(56) References Cited

U.S. PATENT DOCUMENTS

| | | | |
|---|---|---|---|
| 6,888,793 B1 * | 5/2005 | Orui | ............................ 370/229 |
| 2004/0192287 A1 | 9/2004 | Namiki et al. | |
| 2008/0096580 A1 | 4/2008 | Montemurro | |
| 2008/0102830 A1 | 5/2008 | Lee | |
| 2008/0176579 A1 | 7/2008 | Abdel-Kader | |
| 2008/0253393 A1 | 10/2008 | Blackburn et al. | |

(Continued)

FOREIGN PATENT DOCUMENTS

| | | |
|---|---|---|
| EP | 1667379 A1 | 6/2006 |
| WO | WO2010088100 A1 | 8/2010 |

OTHER PUBLICATIONS

Non-Final Office Action for U.S. Appl. No. 13/011,772, mailed on Dec. 6, 2012, Paulo Chow et al., "Smart Connection Manager", 9 pages.

(Continued)

*Primary Examiner* — Brian D Nguyen
(74) *Attorney, Agent, or Firm* — Lee & Hayes, PLLC

(57) ABSTRACT

A telecommunication device configured to perform at least one of adjusting a network polling frequency, prompting a user to select one of a plurality of networks, automatically connecting to one of the networks, or automatically disconnecting from one of the networks is described herein. The telecommunication device performs the adjusting, prompting, or connecting based at least on received device data or network data that is associated with the networks.

21 Claims, 6 Drawing Sheets

(56) References Cited

U.S. PATENT DOCUMENTS

| | | |
|---|---|---|
| 2009/0077207 A1 | 3/2009 | Karaoguz et al. |
| 2009/0077277 A1* | 3/2009 | Vidal et al. ............... 710/46 |
| 2009/0225683 A1* | 9/2009 | Collins et al. ............. 370/255 |
| 2010/0125611 A1 | 5/2010 | Boutboul et al. |
| 2010/0330985 A1* | 12/2010 | Addy ....................... 455/426.1 |
| 2011/0040872 A1* | 2/2011 | Blackburn et al. .......... 709/224 |
| 2011/0134936 A1* | 6/2011 | Andreoli-Fang et al. .... 370/449 |
| 2011/0158244 A1* | 6/2011 | Long et al. ................. 370/401 |
| 2011/0199989 A1 | 8/2011 | Wietfeldt et al. |
| 2011/0208866 A1* | 8/2011 | Marmolejo-Meillon et al. ......................... 709/227 |
| 2011/0230201 A1 | 9/2011 | Hotes et al. |
| 2011/0282964 A1* | 11/2011 | Krishnaswamy et al. .... 709/217 |
| 2011/0300865 A1 | 12/2011 | Kashikar et al. |
| 2012/0015629 A1* | 1/2012 | Olsen et al. ................ 455/411 |
| 2012/0188876 A1 | 7/2012 | Chow et al. |

OTHER PUBLICATIONS

Final Office Action for U.S. Appl. No. 13/011,772, mailed on Mar. 20, 2013, Paulo Chow et al., "Smart Connection Manager", 11 pages.

The PCT Search Report and Written Opinion mailed Aug. 28, 2012 for PCT Application No. PCT/US12/22000, 9 pages.

* cited by examiner

SMART CONNECTION MANAGER

CROSS REFERENCE TO RELATED APPLICATIONS

This is a continuation application which claims priority to commonly assigned, U.S. patent application Ser. No. 13/011,772, filed Jan. 21, 2011, and issues as U.S. Pat. No. 8,514,717 on Aug. 20, 2013, which application is incorporated herein by reference in its entirety.

BACKGROUND

The number, size, types, and availability of cellular networks and other wireless networks have seen rapid advancement. In a short period of time, analog networks have given way to digital networks, networks allowing only voice communication have given way to networks providing simultaneous voice and data communication, and networks using protocols unique to cellular communication have given way to networks utilizing Internet Protocol (IP) based telephony. The networks are often referred to as first generation (1G), second generation (2G), third generation (3G), or fourth generation (4G). Example 2G networks include the Global System for Mobile Communications (GSM). Example transitional networks (dubbed "2.5G" and "2.75G") include General Packet Radio Service (GPRS) networks and Enhanced Data Rates for GSM Evolution (EDGE) networks. Example 3G networks include Universal Mobile Telecommunication System (UMTS) networks and CDMA2000 networks. Example 4G networks include High Speed Packet Access (HSPA) networks, Evolved HSPA (HSPA+) networks, Mobile Wi-Max networks, and Long Term Evolution (LTE) networks.

With these advances in cellular networking, telecommunication devices have greater options for connectivity than ever before. But these networks are only a part of the connectivity options available to telecommunication devices. Some telecommunication devices are also equipped with Wi-Fi or Wi-Max radios enabling the telecommunication devices to connect to local wireless networks and, through those networks, to connection to telecommunication service providers and the Internet to engage in voice and data communication. Also, some telecommunication devices can wirelessly connect to local base stations, such as base stations implemented on a home personal computer (PC). These local base stations are called "femtocells" or "femtos." Femtos in turn have a connection over a public or private data network to a service provider network.

While telecommunication devices are presented with many connectivity options, preferable options often go unused. For example, a user in an airport may be using a 3G network for data communication while a faster Wi-Fi network is available. Because of the user's settings or because the Wi-Fi radio is turned off, the user does not switch to the Wi-Fi network. In another example, a 3G network may be congested with many users engaged in voice communication and many users engaged in data communication. The users engaged in voice communication could be shifted to a 2G network without significant degradation of service, enabling all of the users to communicate on uncongested networks.

Telecommunication devices may be prevented from utilizing the best connectivity option by settings (e.g., preferring the highest speed network available regardless of congestion, disabling Wi-Fi to save battery power, etc.) and by a lack of knowledge regarding device and network conditions that could indicate better connectivity options.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
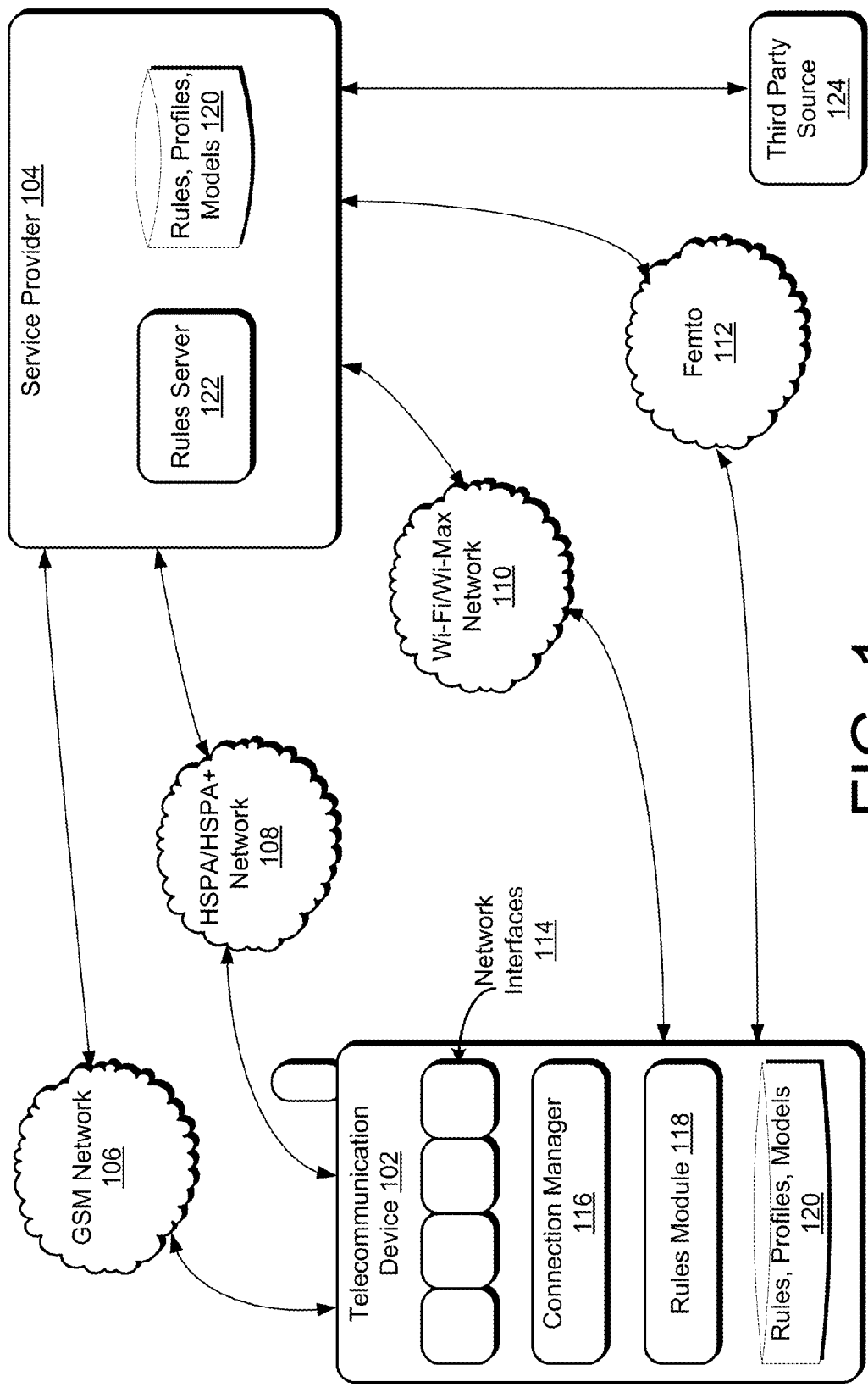
FIG. 1 is a diagram showing an example operating environment including a telecommunication device, a plurality of networks, and a service provider, the telecommunication device capable of polling or connecting to the plurality of networks based at least in part on device data or network data, in accordance with various embodiments.

Described herein is a telecommunication device that is configured to adjust a network polling frequency, prompt a user to select a network, automatically connect to a network, or automatically disconnect from one of the networks. The telecommunication device performs the adjusting, prompting, or connecting based at least in part on device data or network data associated with a plurality of networks. Device data and network data may include, for example, device location, signal strength, network quality, time of day, crowd-sourced data, use of the device, etc. Example networks may include 2G networks, 3G networks, 4G networks, Wi-Fi networks, Wi-Max networks, networks associated with femtos, Bluetooth networks, CDMA networks, UMTS networks, or ZigBee networks.

In some implementations, the telecommunication device applies rules, profiles, or models to the device data or network data and determines an action to perform, such as the adjusting, prompting, or connecting, based at least in part on applying the rules, profiles, or models. These rules, profiles, or models may be learned based on individual or aggregate user behavior, may be received from a service provider, or may be specific to the telecommunication device.

In some implementations, adjusting a network polling frequency comprises 1) reducing the frequency or stopping polling (i.e., searching for a network) or 2) managing a power state of a radio for one of the networks. This adjusting is performed when device data or network data indicates that the telecommunication device is moving or is already connected to the network being polled. Also, the adjusting may include increasing a polling frequency for one network when the device data or network data indicates that the quality of another network is poor. Further, while automatically connecting to one network, the telecommunication device may reduce the network polling frequencies for other networks. Also, while automatically disconnecting from one network, the telecommunication device may increase the network polling frequencies for other networks.

In various implementations, prompting the user to select a network includes prompting a user to connect to a network after determining that a threshold amount of time has been met since the network was detected. Further, the telecommunication device may provide an indication to a user that one of the networks requires a login. This indication may be provided along with a prompt to connect to the secured network.

In some implementations, the connecting includes connecting to different networks for voice communications and for data communications. Also, the telecommunication device may shift a communication from a congested network to another network, automatically connecting to that other network. Further, in some implementations, the connecting comprises automatically connecting to a network associated with a lowest cost, such as a network with the lowest cost for the service provider or a network with the lowest cost for the telecommunication device.

Example Operating Environment

FIG. 1 is a diagram showing an example operating environment including a telecommunication device, a plurality of networks, and a service provider, the telecommunication device capable of polling or connecting to the plurality of networks based at least in part on device data or network data, in accordance with various embodiments. As shown in FIG. 1, a telecommunication device 102 communicates with a service provider 104 over one or more of a plurality of networks 106-112. Such networks may include a GSM network 106, an HSPA/HSPA+ network 108, a Wi-Fi/Wi-Max network 110, or a network associated with a femto 112. The plurality of networks may also include additional or different networks than those shown as networks 106-112.

To communicate with the networks 106-112, the telecommunication device 102 is configured with a plurality of network interfaces 114 that provide programmatic access to radios and other hardware of the telecommunication device 102 for purposes of wireless communication. The telecommunication device 102 also includes a connection manager 116 to perform any of a plurality of actions with regard to the networks 106-112 based on device data or network data that is associated with the networks 106-112. For example, the connection manager 116 may adjust a network polling frequency for a network, may prompt a user to automatically select a network, may automatically connect to a network, or may automatically disconnect from a network. In some implementation, the telecommunication device 102 is equipped with a rules module 118 to build or receive rules, profiles, or models 120 from device data or network data that are used by the connection manager 116 to determine an action to perform with regard to the networks 106-112. Also, these rules, profiles, or models 120 may be received from the service provider 104, which may include a rules server 122 to build the rules, profiles, or models 120.

Further, the service provider 104 may receive data from a third party source 124 that the rules server 122 may use in building the rules, profiles, or models 120.

Figure 5:
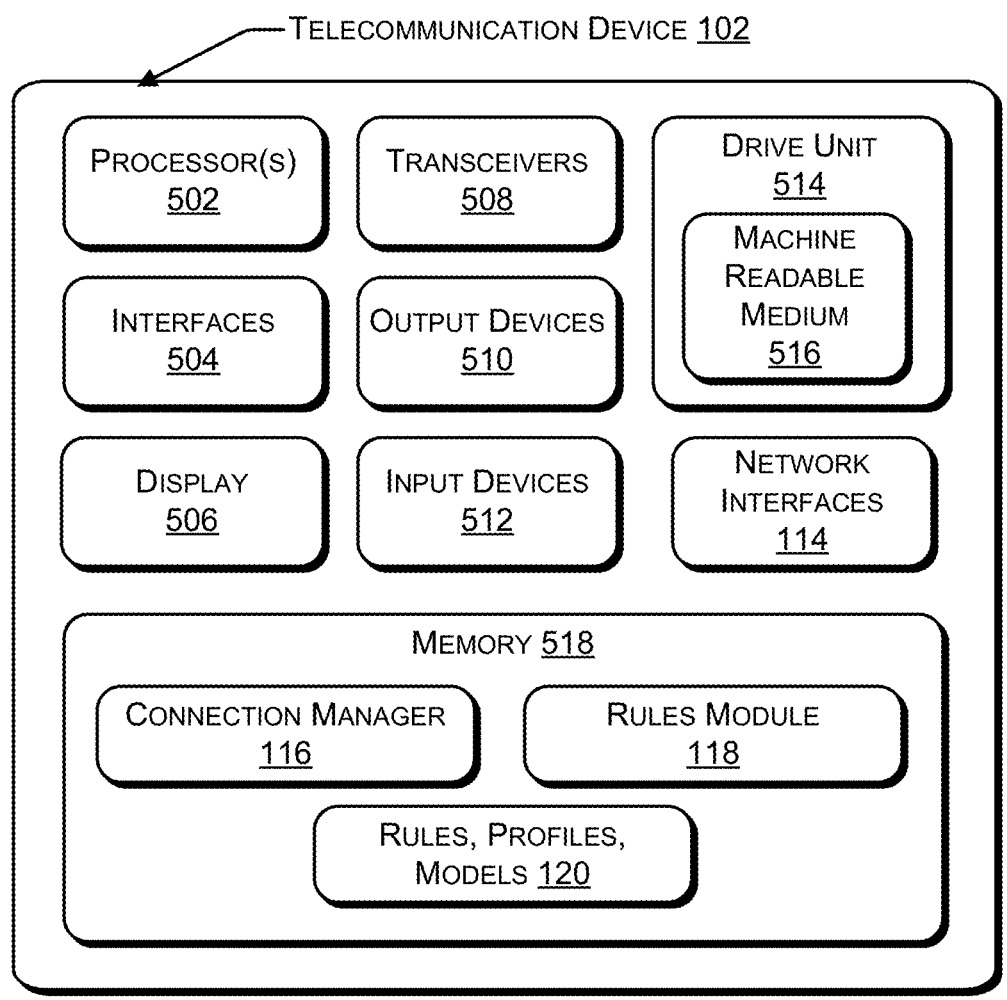
FIG. 5 is a block diagram of an example telecommunication device system architecture, in accordance with various embodiments.

In various implementations, the telecommunication device 102 shown in FIG. 1 is any sort of computing device. The telecommunication device 102 can be a cellular phone, a personal digital assistant (PDA), a personal computer (PC), a laptop computer, a workstation, a server system, a tablet computer, a television, a media player, a digital video recorder, a game device, or a set-top box, or any other sort of device. The telecommunication device 102 may have a fixed location or may be a mobile device capable of wirelessly connecting to any number of other computing devices and satellites. Also, the telecommunication device 102 may have any number of capabilities, such as voice, video, and data communication, and any number of applications and features. In some implementations, the telecommunication device 102 has settings that govern network connection and communication behaviors of the telecommunication device 102, such as settings associated with a Wi-Fi radio of the telecommunication device 102 or settings preferring one type of network over another (e.g., Wi-Fi network 110 over HSPA/HSPA+ network 108). Other components, data and operations of the telecommunication device 102, including network interfaces 114, connection manager 116, rules module 118, and rules, profiles, or models 120, are described below in further detail. An example telecommunication device 102 is illustrated in FIG. 5 and is described below in further detail in reference to that figure.

In some implementations, service provider 104 comprises any one or more computing devices, part or all of which may be involved in provisioning telecommunication services to telecommunication devices, including voice, video, and data communication services. These computing devices may include server systems, workstations, database systems, blade servers, mainframe computers, or other sorts of computing devices. One or more of the computing devices may serve a specific purpose for the service provider 104, such as acting as a gateway node or storing subscriber information. Also, there may exist a network between the computing devices of the service provider 104, such as a local area network (LAN), wide area network (WAN), or any other sort of network. The network between the computing devices of service provider 104 may be private and may be accessible through either or both of public or private networks that are external to the service provider 104. The rules server 122 and rules, profile, or models 120 of the service provider 104 shown in FIG. 1 are described in further detail below.

Also, as illustrated in FIG. 1, the telecommunication device 102 and service provider 104 may be connected by any one or more of a plurality of networks 106-112. While these networks 106-112 may include GSM Network 106, HSPA/HSPA+ Network 108, Wi-Fi/Wi-Max Network 110, or a network associated with a femto 112, they could also include a UMTS Network, a GPRS Network, an LTE network, a CDMA network, or any other sort of cellular network 106-112. For example, the networks 106-112 may include any 2G, 3G, 4G, or later generation cellular network 106-112. Such networks 106-112 may be accessible through base stations or any other sort of access point. The networks 106-112 may utilize radio frequency communication with the telecommunication device 102 or any other sort of technology. Networks 106-112 may also include data networks 106-112, such as the Internet, a Bluetooth network, or a ZigBee network that may carry voice, video, data, or other media communications to service provider 104. Such networks 106-112 may be accessible through LANs, for example, including local wireless networks. Networks 106-112, then, are intended to represent any current and future networks 106-112 that enable communications of any sort between telecommunication device 102 and service provider 104. The third party source 124 may also be connected to the service provider 104 through one or more of the networks 106-112 or through other networks.

In various implementations, the network interfaces 114 of the telecommunication device 102 may include interfaces 114 for each sort of network 106-112 that the telecommunication device is capable of communicating with. For example, interfaces 114 may include Session Initiation Protocol (SIP) user agent clients for networks using the Internet Protocol (IP) for voice, video, or data communications. Interfaces 114 may also include an IP stack or other software enabling cellular or other wireless communications through radio transceivers or other transceivers of the telecommunication device 102.

To optimally utilize the networks 106-112 available to the telecommunication device 102, the telecommunication device 102 utilizes a connection manager 116 to perform any of a number of actions with respect to one or more of the networks 106-112. While the connection manager 116 is shown as a component of the telecommunication device 102, the connection manager 116 could be implemented entirely or in party on any device, such as a computing device of the service provider 104. For example, the action determination described below could be performed on another device and sent to a thin client part of the connection manager 116 that is local to the telecommunication device 102 for execution on the telecommunication device 102. For the sake of illustration, however, further description will be with reference to a connection manager 116 located on the telecommunication device 102.

In various implementations, the connection manager 116 receives or collects at least one of device data or network data. If collecting, the connection manager 116 may collect the device data or network data on a predetermined basis, such as every n time units. The connection manager 116 might also collect the device data or network data in response to being notified of events, such as loss of a network signal. If receiving the device data or network data, the connection manager 116 may receive the data from other components of the telecommunication device 102 or from the service provider 104.

In some implementations, the manner of the receiving or collecting of the device data or network data may depend on the type or source of the device data or network data. For example, device data may include a location of the telecommunication device 102, a pattern or history of user behavior, a signal strength of one of the networks 106-112, a time of day, settings or preferences, a quality of an available network connection, an indication that a user is roaming, a battery power level, a current use of the telecommunication device 102, or any other sort of data that can be determined with reference to metrics and other information captured by the telecommunication device 102. Location, for instance, could be retrieved from a Global Positioning System (GPS) component of the telecommunication device 102 or by performing cell tower triangulation using information received from cell towers. Patterns or history of user behavior could be retrieved from other applications or components of the telecommunication device 102 or could even be included among the rules, profiles, or models 120.

Network data may include inferences or patterns based on behavior of a users of a plurality of telecommunication devices 102, subscription plan information, a location of the telecommunication device 102, settings or preferences, a cost associated with a network 106-112, or policies for offloading network balancing, or any other sort of data that may be received or retrieved from a service provider 104 or other remote source. Service provider 104 may build the inferences or patterns from device data received from multiple telecommunication devices 102 and include such inferences or patterns among the rules, profiles or models.

After receiving or collecting the device data or network data, the connection manager 116 determines any one or more of a number of actions to perform. In some implementations, the determination is based on application of rules, profiles, or models 120 to the device data or network data. These rules, profiles, and models 120 may be specific to a type of device data or network data and may include thresholds. For example, the rules, profiles, or models 120 may include a rule specifying a signal strength threshold and an action to take if the signal strength falls below the threshold, such as increasing a network polling frequency for a Wi-Fi network 110. Rules, profiles, or models 120 may also include profiles relating multiple items of data. For instance, the rules, profiles, or models 120 could include a profile specifying historic types of user activity and locations by time of day (e.g., at 8 p.m., the user is at home and talking to a friend). The rules, profiles, or models 120 could also include a policy preferring a Wi-Fi network 110 over a cellular network and historic information indicating that the user has previously detected an available Wi-Fi network 110 at home. Based on the rules, profiles, or models 120, then, the connection manager could prompt the user to connect to a Wi-Fi network 110 at 8 p.m., could increase a network polling frequency for a Wi-Fi network 110 at 8 p.m., or could automatically connect to a Wi-Fi network 110 at 8 p.m.

In various implementations, the rules, profiles, or models 120 could be stored on the telecommunication device 102, stored remotely at the service provider 104, or stored entirely or partly in both locations. As shown in FIG. 1, the telecommunication device 102 may include a rules module 118 that is capable of building the rules, profiles, or models 120. The rules module 118 may monitor user behavior over time, may receive policies or other directives from the service provider 104, may receive user settings or preferences from other components or applications associated with the telecommunication device 102 or subscriber account, and may refine existing rules, profiles, or models 120 using machine learning techniques. Rules, profiles, or models 120 may be built or refined based on existing rules, profiles, or models 120, on device data or network data, or on any other source of information. For instance, if a user is prompted to select a network 106-112 repeatedly in similar circumstances, and the user chooses not to select the network 106-112, the rules module 118 may refine the rules, profiles, or models 120 to prevent further prompting of the user under those circumstances. The rules module 118 may be an active process running in the background that periodically builds/refines the rules, profiles, or models 120 or may activate in response to events, such as receiving instructions or data from the service provider 104. Once the rules module 118 has built or refined the rules, profiles, or models 120, the rules module 118 may store the resulting rules, profiles, or models 120 locally on the telecommunication device 102, may provide the rules, profiles, or models 120 to the service provider 104, or may store the rules, profiles, or models 120 in another location known and accessible to the connection manager 116. The rules module 118 may also notify the connection manager that the rules, profiles, or models 120 have been built/refined in order to trigger an action by the connection manager 116.

In some implementations, as mentioned above, the actions performed by the connection manager 116 may include any one or more of adjusting a network polling frequency, prompting a user to select a network 106-112, automatically connecting to a network 106-112, or automatically disconnecting from a network 106-112. The connection manager 116 may perform different ones of these actions with respect to a same network 106-112 or with respect to different networks 106-112. The connection manager 116 may also perform the same one of these actions with respect to different networks 106-112. Also, other actions may also be performed based on the rules, profiles, or models 120 and on device data or network data, such as automatically disconnecting from a network 106-112 or automatically enabling or disabling a radio/transceiver associated with a network 106-112. Example scenarios exploring some of these actions performed by the connection manager 116 and the device data, network data, or rules, profiles, or models 120 associated with the actions are discussed below in the section entitled "Example Scenarios."

Figure 6:
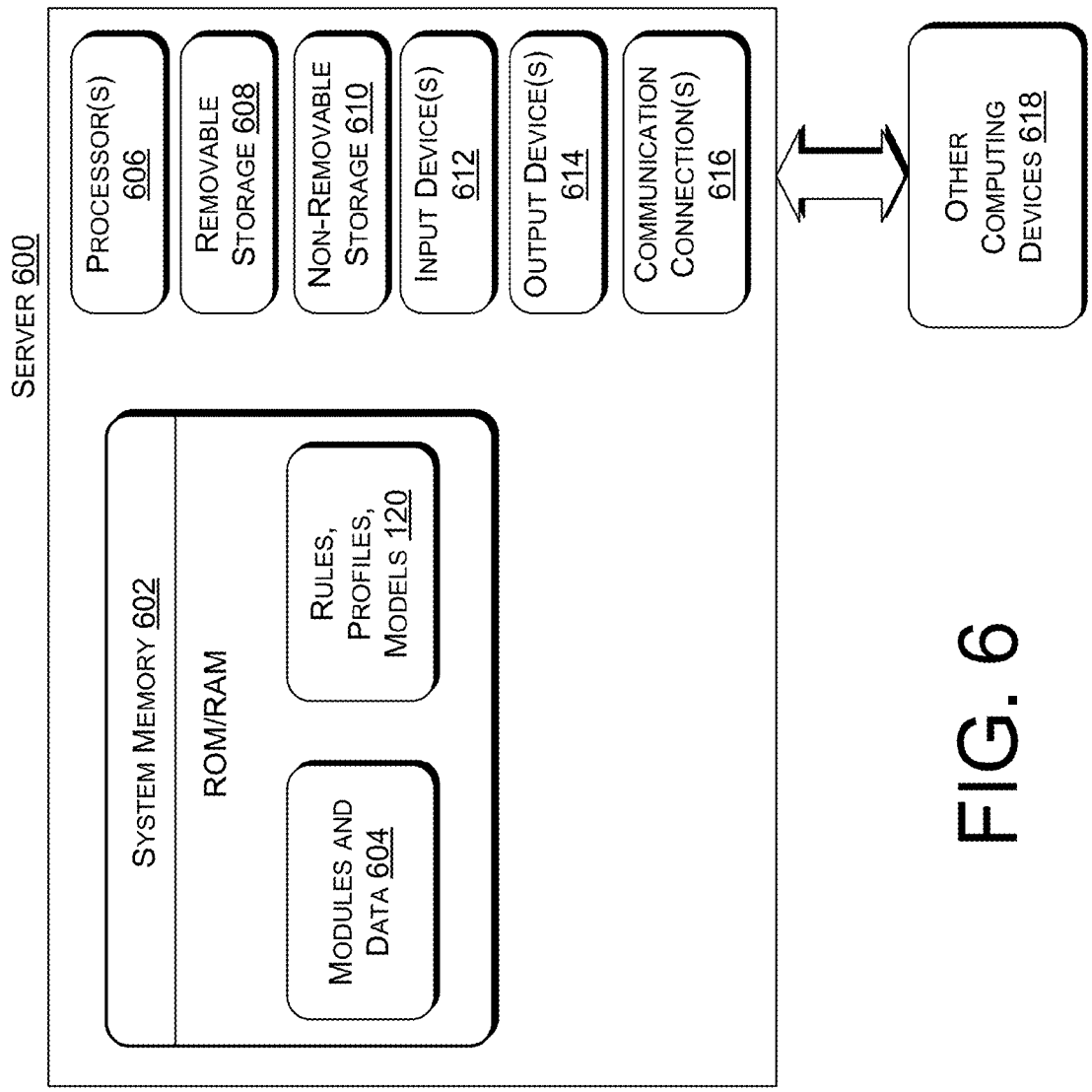
FIG. 6 is a block diagram of an example computer system architecture, in accordance with various embodiments.

In various implementations, the rules server 122 of the service provider 104 may be any sort of computing device. The rules server 122 may be a server system, a work station, a blade server, a mainframe, or any other sort of computing device. Rules server 122 may receive or collect device data from telecommunication devices 102, may synthesize and provide the data of the multiple devices 102 to the telecommunication devices 102 as network data, and may build and store rules, profiles, and models 120. Rules server 122 may also perform any other sort of function of the service provider, such as serving as a gateway node or policy node. Also, while shown as one device, rules server 122 may be implemented across multiple computing devices of the service provider 104. An example rules server 122 is shown in FIG. 6 and described in detail further below with reference to that figure.

In some implementations, rules, profiles, or models 120 may be stored on any computing device of the service provider 104, including on the rules server 122. The rules, profiles, or models 120 may be stored as a database, a file, or any other sort of data structure or structures.

Figure 2:
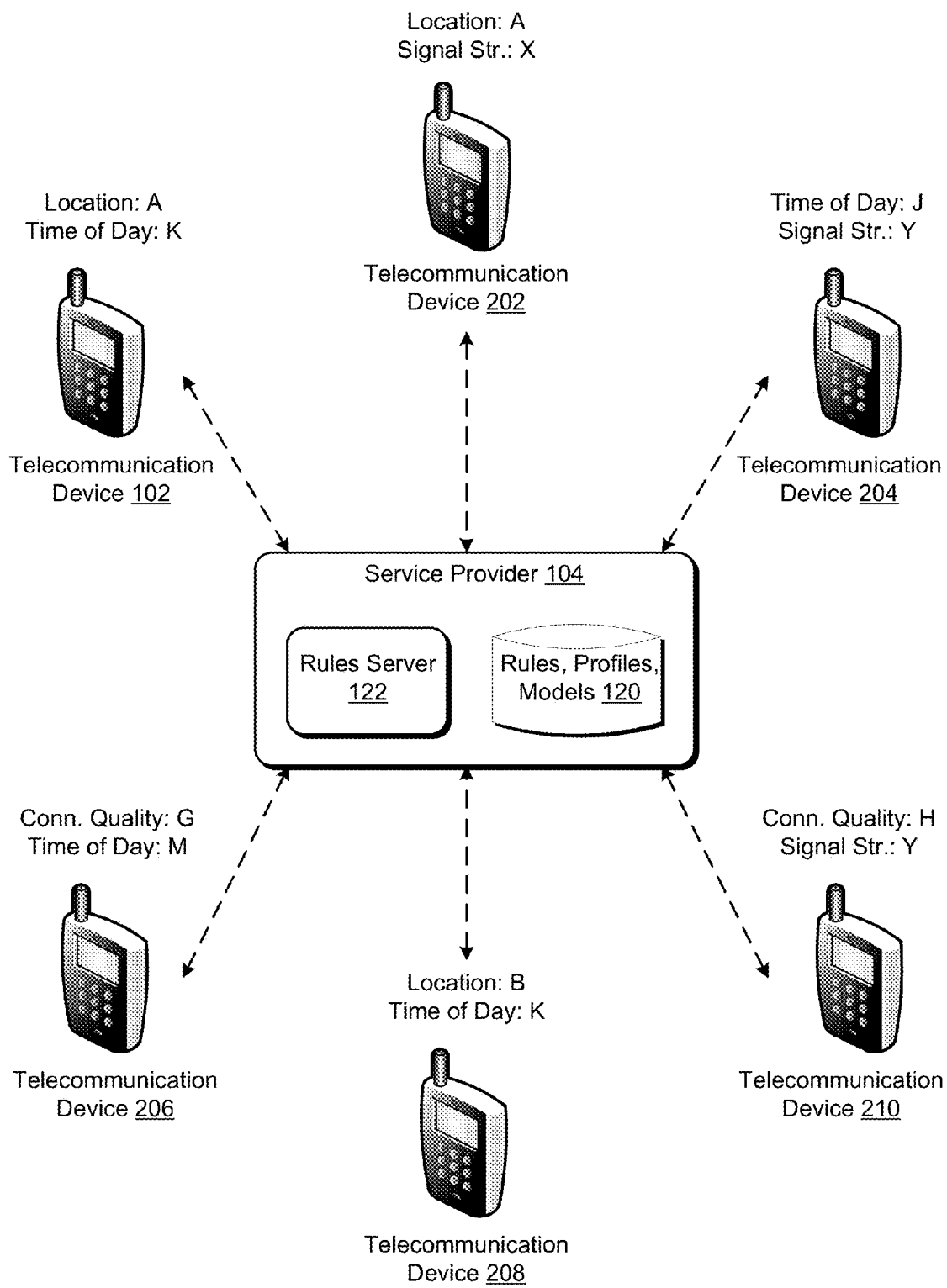
FIG. 2 is a diagram of an example service provider that receives device data from telecommunication devices and builds rules, profiles, or models from the device data, in accordance with various embodiments.

Both the rules server 122 and rules, profiles, or models 120—as stored on the service provider 104—are shown in FIG. 2 and are discussed in greater detail below with reference to that figure.

In various embodiments, the third party source 124 may comprise any computing device or devices known in the art and may be connected to the service provider 104 through one or more of the networks 106-112 or through other networks. The third party data source 124 may provide data that may be used by the rules server 122 to build the rules, profiles, or models 120.

Example Scenarios

As mentioned above, the connection manager 116 may perform any of a number of actions with regard to networks 106-112. In the following description, a number of scenarios involving one or more of these actions are described. These scenarios are provided simply for the sake of illustration and do not limit the types or number of actions performed or the circumstances in which the actions are performed.

In a first scenario, the connection manager 116 receives or retrieves device data or network data indicating that a connection exists with a network 106-112. The connection manager 116 then applies the rules, profiles, or models 120 to the device data or network data. The rules, profiles, or models 120 indicate that the connection manager 116 should decrease a network polling frequency for a network 106-112 that the telecommunication device 102 is currently connected to. The rules, profiles, or models 120 may even specify the amount or degree of the decrease, specify that the polling stop entirely, or may otherwise specify management of a power state of a radio for the network 106-112. Based on applying the rules, profiles, or models 120, then, the connection manager 116 decreases the network polling frequency for the network 106-112 that the telecommunication device 102 is currently connected to.

In a second scenario, the connection manager 116 receives or retrieves device data or network data indicating that the telecommunication device 102 is moving, such as moving a vehicle. The connection manager 116 then applies the rules, profiles, or models 120 to the device data or network data. The applying may include calculating a speed of the telecommunication device 102 by determining the locations detected and the times they were detected at and comparing the speed to a threshold. The rules, profiles, or models 120 may indicate that the connection manager 116 should decrease a network polling frequency for the Wi-Fi/Wi-Max network 110 when the threshold is met or exceeded. The rules, profiles, or models 120 may even specify the amount or degree of the decrease, specify that the polling stop entirely, or may otherwise specify management of a power state of a radio for the Wi-Fi/Wi-Max network 110. Based on applying the rules, profiles, or models 120, then, the connection manager 116 decreases the network polling frequency for the Wi-Fi/Wi-Max network 110.

In a third scenario, the connection manager 116 receives or retrieves device data or network data indicating that the quality of a network 106-112 is poor, that the signal strength of that network 106-112 is weak, or that the network 106-112 in unavailable. The connection manager 116 then applies the rules, profiles, or models 120 to the device data or network data. The rules, profiles, or models 120 may indicate that the connection manager 116 should increase network polling frequencies for one or more others of the networks 106-112 when the quality of the one network 106-112 is poor, when the signal strength of the one network 106-112 is weak, or when the one network 106-112 is unavailable. The rules, profiles, or models 120 may even specify the amount or degree of the increase(s). Based on applying the rules, profiles, or models 120, then, the connection manager 116 increases the network polling frequency for the one or more others of the networks 106-112.

In a fourth scenario, the connection manager 116 receives or retrieves device data or network data that, when analyzed in view of the rules, profiles, or models 120, indicates that the connection manager 116 should automatically connect to a network 106-112. The rules, profiles, or models 120 may also specify that the connection manager 116 should decrease network polling frequencies for one or more of the other networks 106-112 that the telecommunication device 102 is not automatically connecting to. Based on these rules, profiles, or models 120, then the connection manager 116 automatically connects to one network 106-112 concurrently with decreasing network polling frequencies for others of the networks 106-112.

In a fifth scenario, the connection manager 116 receives or retrieves device data or network data indicating that a given network 106-112 has been detected repeatedly during a time period. The connection manager 116 then applies the rules, profiles, or models 120 to the device data or network data. The applying may include calculating a duration of time during which the given network 106-112 was detected and comparing the duration to a threshold. The rules, profiles, or models 120 may indicate that the connection manager 116 should prompt a user to select the given network 106-112 when the threshold is met or exceeded. Based on applying the rules, profiles, or models 120, then, the connection manager 116 prompts the user to select the given network 106-112. If the user selects the given network 106-112, the telecommunication device 102 may attempt to connect to that given network 106-112.

In a sixth scenario, the connection manager 116 receives or retrieves device data or network data indicating that one of the networks 106-112 requires authentication to access the network. The connection manager 116 then applies the rules, profiles, or models 120 to the device data or network data. The rules, profiles, or models 120 may indicate that the connection manager 116 should provide an indication, such as an icon or graphic, to the user indicating that the network 106-112 requires authentication (e.g., in the form of a login). Based on applying the rules, profiles, or models 120, then, the connection manager 116 provides the indication to the user. The user may utilize the indication to determine which one of the networks 106-112 the user should select to connect to.

In a seventh scenario, the connection manager 116 receives or retrieves device data or network data indicating that a cellular network, such as HSPA/HSPA+ network 108, is congested. The connection manager 116 then applies the rules, profiles, or models 120 to the device data or network data. The rules, profiles, or models 120 may indicate that the connection manager 116 should utilize the congested network for data communication and utilize another network, such as GSM network 106 for voice communication. Based on applying the rules, profiles, or models 120, then, the connection manager 116 automatically connects to both the congested network and the other network and enables the telecommunication device 102 to engage in data communication and voice communication on the networks, respectively. The rules, profiles, or models 120 may also specify utilization of different networks for voice and data communications based on other device data or network data.

In an eighth scenario, the connection manager 116 receives or retrieves device data or network data indicating that a network 106-112 is congested. The connection manager 116 then applies the rules, profiles, or models 120 to the device data or network data. The rules, profiles, or models 120 may indicate that the connection manager 116 should automatically connect to another network 106-112 and shift communication or a part of current communication sessions to the other network 106-112. One example might be shifting voice communication while retaining data communication on the congested network 106-112, as described above. The rules, profiles, or models 120 may also make an exception for subscribers to a premium plan. If device data or network data indicates that the telecommunication device 102 is associated with the premium plan, the rules, profiles, or models 120 may specify that the connection manager 116 should not shift communication to the new network. Based on applying the rules, profiles, or models 120, then, the connection manager 116 may automatically connect to the new network 106-112 and shift communication to that network 106-112 (or refrain from doing so in the case of a premium plan).

In a ninth scenario, the connection manager 116 receives or retrieves device data or network data indicating costs associated with some or all of the networks 106-112. The connection manager 116 then applies the rules, profiles, or models 120 to the device data or network data. The rules, profiles, or models 120 may indicate that the connection manager 116 should automatically connect to a network 106-112 associated with a lowest cost. Based on applying the rules, profiles, or models 120, then, the connection manager 116 may automatically connect to the network 106-112 having the lowest cost.

In a tenth scenario, the connection manager 116 receives or retrieves device data or network data indicating an amount of usage time or data throughput associated with a network 106-112 and a subscriber plan (e.g., a number of minutes left for a month). The connection manager 116 then applies the rules, profiles, or models 120 to the device data or network data. The applying may involve comparing the usage time or throughput to a threshold and determining if the usage time or throughput exceeds the threshold. The rules, profiles, or models 120 may indicate that the connection manager 116 should automatically connect to a different network, such as a Wi-Fi network 110 when the usage time or throughput exceeds the threshold. Based on applying the rules, profiles, or models 120, then, the connection manager 116 may automatically connect to the different network.

Example Service Provider

FIG. 2 is a diagram of an example service provider that receives device data from telecommunication devices and builds rules, profiles, or models from the device data, in accordance with various embodiments. As shown in FIG. 2, a service provider 104 may be connected to telecommunication device 102 and a plurality of other telecommunication devices 202-210 and may receive device data from the telecommunication device 102 and telecommunication devices 202-210. A rules server 122 of the service provider 104 utilizes the received device data to build or refine the rules, profiles, or models 120. The service provider 104 may then provide the rules, profiles, or models 120 to the telecommunication device 102 and telecommunication devices 202-210.

The service provider 104, rules server 122, rules, profiles, or models 120, and telecommunication device 102 are all described above with reference to FIG. 1. Telecommunication devices 202-210 may be the same sort of devices telecommunication device 102 and may each communicate with the service provider 104 through one or more of the networks 106-112 or through a different network or networks. Each of the telecommunication devices 202-210 may also include network interfaces 114, a connection manager 116, a rules module 118, and rules, profiles, or models 120. Also, each of the telecommunication devices 202-210 may be associated with different device data. For example, telecommunication device 202 has a location 'A' and a signal strength 'X.' Telecommunication device 204 has a time of day 'J' and a signal strength 'Y.' Telecommunication device 206 has a connection quality 'G' and a time of day 'M.' Telecommunication device 208 has a location 'B' and a time of day 'K.' Telecommunication device 210 has a connection quality 'H' and a signal strength 'Y.' Also, the telecommunication device 102 is shown having a location 'A' and a time of day 'K.'

In various implementations, the rules server 122 retrieves or receives the device data from the telecommunication device 102 and telecommunication devices 202-210. The rules server 122 may perform the retrieving on some sort of basis, such as a periodic basis. Upon receiving the device data, the rules server 122 may simply provide the collective data to the telecommunication device 102 and telecommunication devices 202-210 as network data or may process the device data to generate network data. For example, the rules server 122 may use techniques similar to those used to build and refine the rules, profiles, or models 120 to generate the network data. One example of such techniques is machine learning techniques. Such techniques may be used to draw inferences from aggregate information of the telecommunication device 102 and telecommunication devices 202-210 in order to, for instance, predict network quality and availability in a location where a telecommunication device 102/202-210 has not visited. This generated network data may, in some implementations, then be added to the rules, profiles, or models 120 or used to refine the rules, profiles, or models 120. Also, this generated network data may be provided to the telecommunication device 102 and telecommunication devices 202-210.

Also, as mentioned above, the rules server 122 may receive data from a third party source 124 (shown in FIG. 1). This data may be relevant to the building of rules, profiles, or models 120.

In some implementations, the rules server 122 utilizes one or more of the device data from the telecommunication device 102 and telecommunication devices 202-210, the generated network data, or the data from the third party source 124 to build or refine the rules, profile, or models 120. The rules server 122 may build or refine the rules, profile, or models 120 in a manner similar to the rules model 118 of telecommunication device 102. The rules server 118 may utilize machine learning techniques, settings or preferences of subscribers, or policies of the service provider 104 to evaluate the device data or network data and to build or refine rules, profile, or models 120 from the device data or network data. For example, if multiple telecommunication devices 102/202-210 at a given location detect a Wi-Fi Network 110, the rules server 122 may build a rule specifying that a connection manager 116 should increase a network polling frequency for the Wi-Fi network 110 or should automatically connect to the Wi-Fi network 110 when a telecommunication device 102/202-210 is at the given location. The rules server 122 may also utilize information in addition to the device data and network data, such as information associated with a subscriber account. Such information could be retrieved from a billing system of the service provider 104 and utilized to build or refine the rules, profile, or models 120. The information could include, for example, both a contracted number of minutes per month for voice communication and a number or percentage of those minutes that have been used.

In some implementations, the rules server 122 may build or refine rules, profile, or models 120 for each subscriber, as different subscription plans and subscriber settings or preferences may call for different rules, profile, or models 120. The rules server 122 may build or refine such rules based on the generated network data and on device data of one or more telecommunication devices 102/202-210 that are associated with a given subscriber. Building or refining the rules, profile, or models 120 for each subscriber may occur concurrently or serially over time. For example, the rules server 122 may receive device data from only a single telecommunication device 102/202-210 and may use that device data and network data to build or refine rules, profile, or models 120 for a subscriber associated with that telecommunication device 102/202-210.

Once the rules, profile, or models 120 have been built or refined, the rules server 122 may provide the rules, profile, or models 120 to the telecommunication device 102 and telecommunication devices 202-210. The rules server 122 may also store the rules, profile, or models 120 on storage local to the rules server 122 or on other storage of the service provider 104. If multiple sets of rules, profile, or models 120 were built or refined for multiple subscribers, information indicating a subscriber or subscribers may be stored with each set of rules, profile, or models 120 to enable future retrieval and building or refining.

In various implementations, the rules server 122 may perform all or part of the role of the connection manager 116. Having the device data, network data, and rules, profiles, or models, the rules server 122 may determine an action for the telecommunication device 102 or a telecommunication device 202-210 to perform and may instruct the telecommunication device 102/202-210 to perform the action. Such instructions may be received by a "thin" version of the connection manager 116 which executes the instructions or provides the instructions to network interfaces 114 or applications for execution. Alternatively, the telecommunication device 102/202-210 may not have a connection manager 116 and the instructions from the rules server 122 may be provided directly to the network interfaces 114 or applications for execution. In yet other implementations, the telecommunication device 102/202-210 may have the "full" connection manager 116 described above with regard to FIG. 1, but that connection manager 116 may have the added capability of receiving instructions from rules server 122 and of executing an action based on the instructions or of providing the instructions to network interfaces 114 or applications for execution. Such instructions may include, for example, instructions to shift communication from a current network 106-112 to a new network 106-112.

Example Operations

Figure 3:
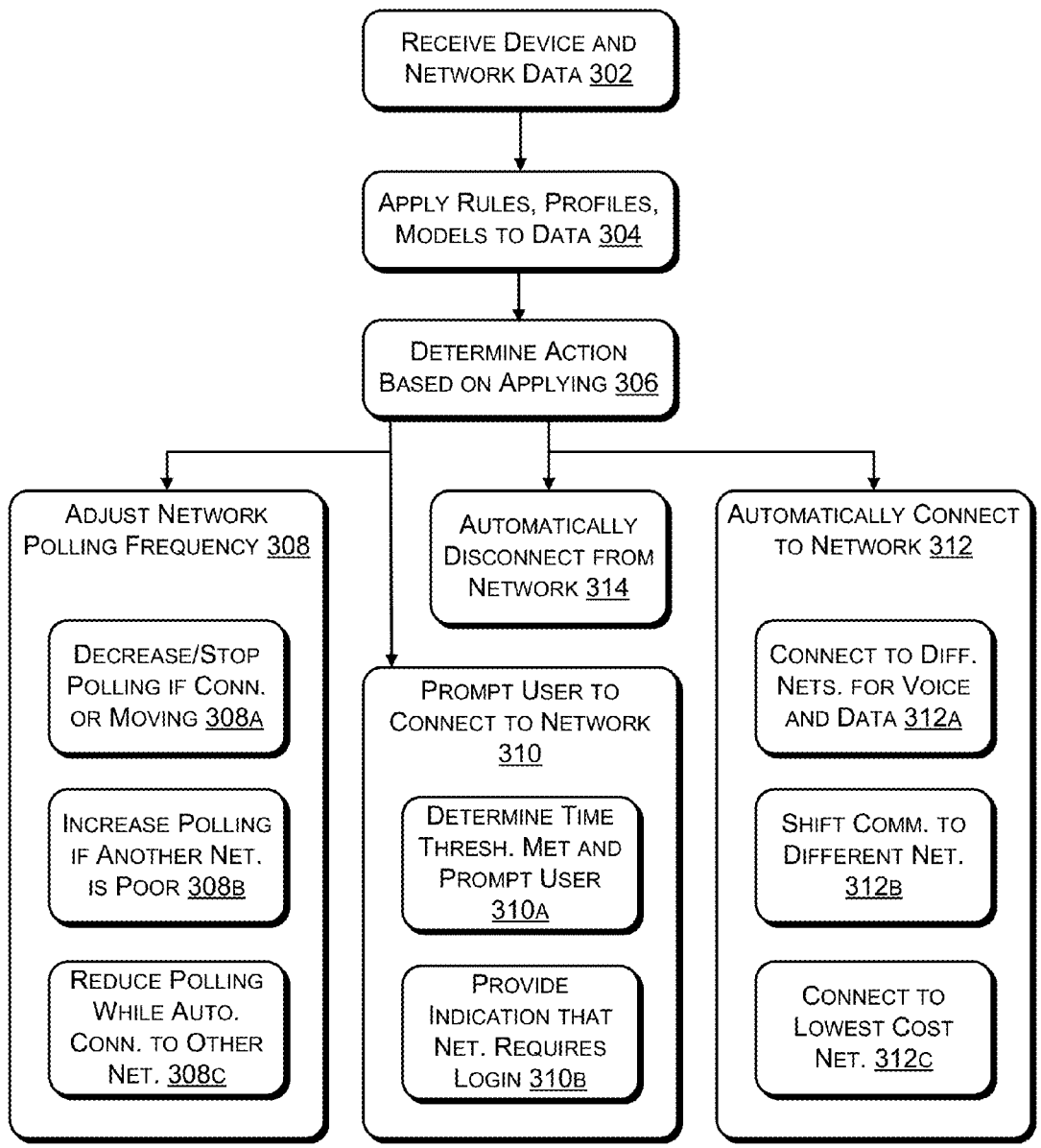
FIG. 3 is a flowchart showing a method of performing, based on device data or network data, at least one of adjusting a network polling frequency, prompting a user to select one of the networks, automatically connecting to one of the networks, or automatically disconnecting from one of the networks, in accordance with various embodiments.

FIG. 3 is a flowchart showing a method of performing, based on device data or network data, at least one of adjusting a network polling frequency, prompting a user to select one of the networks, automatically connecting to one of the networks, or automatically disconnecting from one of the networks, in accordance with various embodiments. As illustrated at block 302, a telecommunication device receives at least one of device data or network data, the device data or network data being associated with a plurality of networks. The device data may include at least one of a location of the telecommunication device, a pattern or history of user behavior, a signal strength of one of the networks, a time of day, settings or preferences, a quality of an available network connection, an indication that a user is roaming, a use of the telecommunication device, or a battery power level. The network data may include inferences or patterns based on behavior of a users of a plurality of telecommunication devices, subscription plan information, a location of the telecommunication device, settings or preferences, a cost associated with a network, or policies for offloading or network balancing. Also, the plurality of networks may include at least one of a 2G network, a 3G network, a 4G network, a GSM network, a HSPA network, a HSPA+ network, a Wi-Fi network, a Wi-Max network, a network associated with a femto, a Bluetooth network, a CDMA network, a UMTS network, or a ZigBee network.

At block 304, the telecommunication device applies one or more rules, profiles, or models to the received device data or network data. Based on the applying, at block 306, the telecommunication device determines whether to adjust a network polling frequency, to prompt a user to select one of the networks, to automatically connect to one of the networks, or to automatically disconnect from one of the networks. In some implementations, the rules, profiles, or models are a local version of rules, profiles, or models received from a service provider. Also, the rules, profiles, or models may be specific to a location, a time of day, an event, or a type of individual or aggregate user behavior or activity. Further, the rules, profiles, or models may be learned based on individual or aggregate user activities, behaviors, or responses to prompts.

At block 308, the telecommunication device adjusts a network polling frequency. The adjusting may comprise, at block 308a, decreasing or stopping polling of one of the networks in response to device data or network data indicating a current network connection or indicating that the telecommunication device is moving. Also, the adjusting may comprise, at block 308a, managing a power state of a radio for one of the networks in response to the device data or the network data indicating the current network connection or indicating that the telecommunication device is moving. At block 308b, the adjusting may include increasing the network polling frequency for one of the networks when the device data or network data indicates that a quality of another of the networks is poor. Also, at block 308*c*, the adjusting may involve reducing network polling frequencies for ones of the networks when the telecommunication device automatically connects to another of the networks.

At block 310, the telecommunication device prompts a user to select one of the networks. The prompting may comprise, at block 310*a*, determining a threshold amount of time since a network was detected has been met and, responsive to the threshold amount of time being met, prompting the user to connect to the detected network. At block 310*b*, the prompting may include providing an indication to the user that one of the networks requires a login.

At block 312, the telecommunication device automatically connects to one of the networks. At block 312*a*, the connecting may comprise automatically connecting to a different network for one of voice or data communication than a network associated with a current network connection for the other of voice or data communication. At block 312*b*, the connecting may include shifting a communication from a current network connection to a new network connection associated with a different network when the device data or network data indicates that a network associated with the current network connection is congested. In some implementations, the shifting is performed for voice communications and not for data communications. Also, the shifting may be performed conditionally based on whether the user has subscribed to a premium plan. At block 312*c*, the connecting may involve automatically connecting to one of the networks having the lowest cost.

At block 314, the telecommunication device automatically disconnects from one of the networks.

Figure 4:
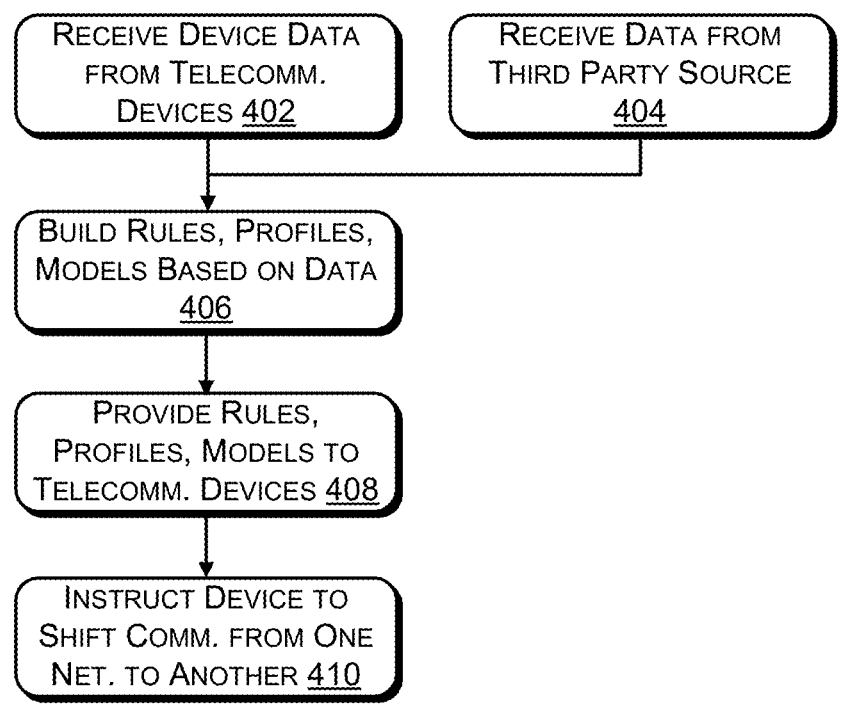
FIG. 4 is a flowchart showing a method of building rule, profiles, or models based at least in part on device data associated telecommunication devices, in accordance with various embodiments.

FIG. 4 is a flowchart showing a method of building rule, profiles, or models based at least in part on device data associated telecommunication devices, in accordance with various embodiments. As illustrated at block 402, one or more computing devices may receive device data associated with at least one of network connections or individual or aggregate user behavior of a plurality of telecommunication devices. At block 404, the one or more computing devices may also or instead receive data from a third party source.

At block 406, the one or more computing devices may build one or more rules, profiles, or models for governing network connection behavior of the telecommunication devices based on the received device data or on the data from the third party source. In some implementations, the building comprises building rules, profiles, or models for each subscriber associated with one of the telecommunication devices.

At block 408, the one or more computing devices provide the rules, profiles, or models to at least one of the telecommunication devices to enable the telecommunication device to perform, based on the rules, profiles, or models, at least one of adjusting a network polling frequency, prompting a user to select one of a plurality of networks, or automatically connecting to one of the networks.

At block 410, the one or more computing devices instruct one of the telecommunication devices to shift from a current network connection associated with a current network to a new network connection associated with a different network.

Example System Architectures

FIG. 5 is a block diagram of an example telecommunication device system architecture, in accordance with various embodiments. As shown, the telecommunication device 102 may include processor(s) 502, interfaces 504, a display 506, transceivers 508, output devices 510, input devices 512, and drive unit 514 including a machine readable medium 516. The telecommunication device 102 may also include network interfaces 114. The telecommunication device 102 further includes a memory 518, the memory 518 storing a connection manager 116, a rules module 118, and rules, profiles, or models 120.

In some embodiments, the processor(s) 502 is a central processing unit (CPU), a graphics processing unit (GPU), or both CPU and GPU, or any other sort of processing unit.

In various embodiments, the interfaces 504 are any sort of interfaces. Interfaces 504 include any one or more of a wireless LAN interface, a universal serial bus (USB) driver, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. Such an interface 504 may include the network interfaces 114 or provide additional wireless communication interfaces. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 506 is a liquid crystal display or any other type of display commonly used in telecommunication devices. For example, display 506 may be a touch-sensitive display screen, and can then also act as an input device or keypad, such as for providing a soft-key keyboard, navigation buttons, or the like.

In some embodiments, the transceivers 508 include any sort of transceivers known in the art. For example, transceivers 508 may include a radio transceiver that performs, in conjunction with an interface 504 or network interface 114, the function of transmitting and receiving radio frequency communications via an antenna. The radio transceiver may facilitate wireless connectivity between the telecommunication device 102 and various cell towers, base stations, and/or access points of a telecommunication service provider network or may facilitate wireless connectivity between the telecommunication device 102 and routers or hot spots of a wireless LAN. The transceivers 508 may include, for example, a Wi-Fi radio or a Wi-Max radio. The transceivers 508 may also include a near field antenna for near field communications.

In some embodiments, the output devices 510 include any sort of output devices known in the art, such as a display (already described as display 506), speakers, a vibrating mechanism, or a tactile feedback mechanism. Output devices 510 also include ports for one or more peripheral devices, such as headphones, peripheral speakers, or a peripheral display.

In various embodiments, input devices 512 include any sort of input devices known in the art. For example, input devices 512 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 516 stores one or more sets of instructions (e.g., software) embodying any one or more of the methodologies or functions described herein. The instructions may also reside, completely or at least partially, within the memory 518 and within the processor(s) 502 during execution thereof by the telecommunication device 102. The memory 518 and the processor(s) 502 also may constitute machine readable media 516.

Network interfaces 114 have been described above in detail. As mentioned above, the network interfaces may be associated with GSM/UMTS networks 106, HSPA/HSPA+ networks 108, Wi-Fi/Wi-Max networks 110, networks 112 associated with femtos, or other networks.

In various embodiments, memory 518 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 518 includes a SIM (subscriber identity module) card, which is a removable memory card used to identify a user of the telecommunication device 102 to a service provider network. Memory 518 can also be described as computer storage media and may include volatile and nonvolatile, removable and non-removable media implemented in any method or technology for storage of information, such as computer readable instructions, data structures, program modules, or other data.

As illustrated in FIG. 5, the memory 518 store data and modules 116-120. These modules may comprise methods, threads, processes, applications or any other sort of executable instructions. Also, any of the modules may form part of a telecommunication device platform that includes an operating system and applications or may instead be third party applications. Further description of connection manager 116, the rules module 118, and the rules, profiles, or models 120 can be found above.

FIG. 6 is a block diagram of an example computer system architecture, in accordance with various embodiments. The server 600 illustrated in FIG. 6 may represent rules server 122 or any other server or computing device of service provider 104. As illustrated, server 600 comprises a system memory 602 storing modules and data 604 and, optionally, rules, profiles, or models 120. Also, server 600 includes processor(s) 606, a removable storage 608 and non-removable storage 610, input device(s) 612, output device(s) 614 and communication connections 616 for communicating with other computing devices 618.

In various embodiments, system memory 602 is volatile (such as RAM), non-volatile (such as ROM, flash memory, etc.) or some combination of the two. The modules or data 604 stored in the system memory 602 may comprise methods, threads, processes, applications or any other sort of executable instructions, such as the instructions utilized to perform the operations of rules server 122. The rule, profiles, or models 120 are described above in detail. These rule, profiles, or models 120 may be stored on the rules server 122 or on a separate computing device. In some implementations, the rule, profiles, or models 120 are a local copy of rule, profiles, or models 120 that are stored on another computing device of the service provider 104.

In some embodiments, the processor(s) 606 is a central processing unit (CPU), a graphics processing unit (GPU), or both CPU and GPU, or other processing unit or component known in the art.

Server 600 also includes additional data storage devices (removable and/or non-removable) such as, for example, magnetic disks, optical disks, or tape. Such additional storage is illustrated in FIG. 6 by removable storage 608 and non-removable storage 610. Computer storage media may include volatile and nonvolatile, removable and non-removable media implemented in any method or technology for storage of information, such as computer readable instructions, data structures, program modules, or other data. System memory 602, removable storage 608 and non-removable storage 610 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 600. Any such computer-readable storage media may be part of server 600.

Server 600 also has input device(s) 612, such as a keyboard, a mouse, a touch-sensitive display, voice input device, etc., and output device(s) 614 such as a display, speakers, a printer, etc. These devices are well known in the art and need not be discussed at length here.

Server 600 also contains communication connections 616 that allow the server 600 to communicate with other computing devices 618, such as other computing devices of the service provider 104.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   receiving, by a telecommunication device, at least one of device data or network data, the device data or network data being associated with a plurality of networks; and
   based at least on the received device data or network data, adjusting, by the telecommunication device, a network polling frequency, wherein the adjusting the network polling frequency comprises:
     decreasing or stopping polling of one of the networks in response to device data or network data indicating a current network connection or indicating that the telecommunication device is moving; or
     managing a power state of a radio for one of the networks in response to the device data or the network data indicating the current network connection or indicating that the telecommunication device is moving.

2. The method of claim 1, wherein the plurality of networks include at least one of a 2G network, a 3G network, a 4G network, a GSM network, a HSPA network, a HSPA+network, a Wi-Fi network, a Wi-Max network, a network associated with a femto, a Bluetooth network, a CDMA network, a UMTS network, or a ZigBee network.

3. The method of claim 1, wherein the device data includes at least one of a location of the telecommunication device, a pattern or history of user behavior, a signal strength of one of the networks, a time of day, settings or preferences, a quality of an available network connection, an indication that a user is roaming, a use of the telecommunication device, or a battery power level.

4. The method of claim 1, wherein the network data includes inferences or patterns based on behavior of users of a plurality of telecommunication devices, subscription plan information, a location of the telecommunication device, settings or preferences, a cost associated with a network, or policies for offloading or network balancing.

5. The method of claim 1, further comprising, based at least on the received device data or network data, automatically connecting to a different network for one of voice or data communication than a network associated with a current network connection for the other of voice or data communication.

6. The method of claim 1, further comprising applying one or more rules, profiles, or models to the received device data or network data and determining, based on the applying, whether to adjust the network polling frequency.

7. The method of claim 1, further comprising, based at least on the received device data or network data, shifting a communication from a current network connection to a new network connection associated with a different network when the device data or network data indicates that a network associated with the current network connection is congested.

8. The method of claim 7, wherein the shifting is performed for voice communications and not for data communications.

9. The method of claim 7, wherein the shifting is performed conditionally based on whether the user has subscribed to a premium plan.

10. The method of claim 1, wherein the device data or network data indicates that a quality of one of the networks is poor and the adjusting the network polling frequency comprises increasing the network polling frequency for another of the networks.

11. The method of claim 1, further comprising automatically connecting to one of the networks and reducing network polling frequencies for others of the networks.

12. The method of claim 1, further comprising determining a threshold amount of time since a network was detected has been met and, responsive to the threshold amount of time being met, prompting the user to connect to the detected network.

13. The method of claim 1, further comprising recognizing that one of the networks requires a login and providing an indication to the user that the network requires the login.

14. The method of claim 1, wherein the network data indicates costs associated with the networks and the telecommunication device automatically connects to one of the networks having the lowest cost.

15. A telecommunication device comprising:
a processor;
a memory communicatively coupled to the processor and storing at least one of rules, profiles, or models associated with connections to a plurality of networks; and
a smart connection manager configured to be operated by the processor to perform operations including:
receiving at least one of device data or network data,
analyzing the device data or network data based on the at least one of the rules, profiles, or models, and
based on the analyzing, automatically disconnecting from one of the networks and increasing network polling frequencies for others of the networks.

16. The telecommunication device of claim 15, wherein the rules, profiles, or models are a local version of rules, profiles, or models received from a service provider.

17. The telecommunication device of claim 15, wherein the rules, profiles, or models are specific to a location, a time of day, an event, or a type of individual or aggregate user behavior or activity.

18. The telecommunication device of claim 15, wherein the rules, profiles, or models are learned based on individual or aggregate user activities, behaviors, or responses to prompts.

19. One or more non-transitory computer storage media comprising computer executable instructions stored thereon and configured to instruct one or more computing devices to perform operations including:
receiving device data associated with at least one of network connections or user behavior of a plurality of telecommunication devices;
receiving data from a third party source;
building one or more rules, profiles, or models based on the received device data and on the data from the third party source, wherein the one or more rules, profiles, or models are for governing network connection behavior of the telecommunication devices; and
providing the rules, profiles, or models to at least one of the telecommunication devices to enable the telecommunication device to perform, based on the rules, profiles, or models, at least one of adjusting a network polling frequency, prompting a user to select one of a plurality of networks, automatically connecting to one of the networks, or automatically disconnecting from one of the networks.

20. The one or more non-transitory computer storage media of claim 19, wherein the building comprises building rules, profiles, or models for each subscriber associated with one of the telecommunication devices.

21. The one or more non-transitory computer storage media of claim 19, wherein the operations further include instructing one of the telecommunication devices to shift from a current network connection associated with a current network to a new network connection associated with a different network.

* * * * *